(12) United States Patent
Zha

(10) Patent No.: US 10,552,644 B2
(45) Date of Patent: Feb. 4, 2020

(54) METHOD AND APPARATUS FOR DISPLAYING INFORMATION CONTENT

(71) Applicant: Tencent Technology (Shenzhen) Company Limited, Shenzhen (CN)

(72) Inventor: Wen Zha, Shenzhen (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 189 days.

(21) Appl. No.: 15/191,343

(22) Filed: Jun. 23, 2016

(65) Prior Publication Data

US 2016/0307002 A1 Oct. 20, 2016

Related U.S. Application Data

(63) Continuation of application No. PCT/CN2015/078653, filed on May 11, 2015.

(30) Foreign Application Priority Data

Jun. 10, 2014 (CN) .......................... 2014 1 0256568

(51) Int. Cl.
*G06F 21/84* (2013.01)
*G06F 21/10* (2013.01)
*G06F 21/62* (2013.01)

(52) U.S. Cl.
CPC .............. *G06F 21/84* (2013.01); *G06F 21/10* (2013.01); *G06F 21/6218* (2013.01)

(58) Field of Classification Search
CPC .......... G06F 21/84; G06F 21/10; G06F 21/62; G06F 21/6218; G06F 2221/032;
(Continued)

(56) References Cited

U.S. PATENT DOCUMENTS

| 7,779,475 B2* | 8/2010 | Jakobson | G06F 21/62 726/26 |
| 2003/0006957 A1* | 1/2003 | Colantonio | G06F 21/84 345/156 |

(Continued)

FOREIGN PATENT DOCUMENTS

| CN | 103116442 A | 5/2013 |
| CN | 104050422 A | 9/2014 |

(Continued)

OTHER PUBLICATIONS

Tencent Technology, IPRP, PCT/CN2015/078653, Dec. 15, 2016, 6 pgs.

(Continued)

*Primary Examiner* — Jeffrey C Pwu
*Assistant Examiner* — Ali H. Cheema
(74) *Attorney, Agent, or Firm* — Morgan, Lewis & Bockius LLP

(57) ABSTRACT

A computing device receives information content, which is rendered in a predefined display area of the display. When the information content satisfies predefined conditions privacy requirement), the computing device generates a shielding layer for the information content before rendering the shielding layer and displays the shielding layer on top of the display area such that the information content becomes invisible. Subsequently, the computing device receives a shielding layer hiding instruction from a user of the computing device. In response to the shielding layer hiding instruction, the computing device hides the shielding layer from the display area and restores the shielding layer on top of the display area after a predefined hiding period in accordance with a shielding layer hiding mechanism.

12 Claims, 13 Drawing Sheets

(58) Field of Classification Search
CPC ...... G06F 21/6245; G06F 21/60; G06F 3/048; G06F 2221/2107; G06F 21/602; G06F 11/30; G06F 21/6209; H04L 51/18
USPC .......... 726/26, 2, 27, 50, 189; 713/193, 200, 713/165, 168; 709/206; 345/156, 629, 345/641
See application file for complete search history.

(56) References Cited

U.S. PATENT DOCUMENTS

| | | | |
|---|---|---|---|
| 2004/0193910 A1* | 9/2004 | Moles | G06F 21/62 726/27 |
| 2007/0006316 A1* | 1/2007 | Veselova | G06F 21/6245 726/26 |
| 2013/0194301 A1* | 8/2013 | Robbins | G06F 21/60 345/629 |
| 2013/0227413 A1* | 8/2013 | Thorsander | G06F 3/0482 715/716 |
| 2014/0108793 A1* | 4/2014 | Barton | G06F 21/6218 713/165 |
| 2014/0201527 A1* | 7/2014 | Krivorot | G06F 21/6209 713/168 |
| 2014/0283112 A1* | 9/2014 | Wang | G06F 21/84 726/27 |
| 2015/0172246 A1* | 6/2015 | Velummylum | H04L 51/18 709/206 |
| 2015/0324614 A1* | 11/2015 | Dey | G06K 9/6254 345/641 |

FOREIGN PATENT DOCUMENTS

| | | | | |
|---|---|---|---|---|
| GB | 2505405 A | * | 3/2014 | ........... G06F 9/4443 |
| WO | WO 2014027195 A1 | | 2/2014 | |

OTHER PUBLICATIONS

Tencent Technology, ISRWO, PCT/CN2015/078653, Jul. 29, 2015, 8 pgs.

* cited by examiner

METHOD AND APPARATUS FOR DISPLAYING INFORMATION CONTENT

RELATED APPLICATION

This application is a continuation application of PCT Patent Application No. PCT/CN2015/078653, entitled "METHOD AND APPARATUS FOR DISPLAYING INFORMATION CONTENT" filed on May 11, 2015, which claims priority to Chinese Patent Application No. 201410256568.X, entitled "METHOD AND APPARATUS FOR DISPLAYING INFORMATION CONTENT" filed on Jun. 10, 2014, both of which are incorporated by reference in their entirety.

TECHNICAL FIELD

The present application relates to the field of computer technologies, and in particular, to a method and a computing device for displaying information content.

BACKGROUND

When displaying information content, an existing mobile phone or computer often directly uses a content display box to display the information content, for example, a message record in a dialog box of a chat window, web page content in a browser, to a user. However, in a public place, content displayed on a terminal device of the user would be easily seen by another user, which easily causes privacy leak. As a result, the security level is low.

SUMMARY

The above deficiencies and other problems associated with the conventional approach of displaying information content on a mobile device or a computer are reduced or eliminated by the invention disclosed below. In some embodiments, the present application is implemented in a computing device (e.g., laptop, desktop, game console, smartphone, personal digital assistant, smartphone, etc.) that has one or more processors, memory and one or more modules, programs or sets of instructions stored in the memory for performing multiple functions. Instructions for performing these functions may be included in a computer program product configured for execution by one or more processors and stored in a non-transitory computer readable medium.

One aspect of the present application involves a computer-implemented method performed by a computing device having one or more processors and memory and a display. The computing device receives information content, which is rendered in a predefined display area of the display. When the information content satisfies predefined conditions (e.g., privacy requirement), the computing device generates a shielding layer for the information content before rendering the information content and displays the shielding layer on top of the display area such that the information content becomes invisible. Subsequently, the computing device receives a shielding layer hiding instruction from a user of the computing device. In response to the shielding layer hiding instruction, the computing device hides the shielding layer from the display area and restores the shielding layer on top of the display area after a predefined hiding period in accordance with a shielding layer hiding mechanism.

Another aspect of the present application involves a computing device including memory, one or more processors, and one or more program modules stored in the memory and configured for execution by the one or more processors to perform the method described above.

Yet another aspect of the present application involves a non-transitory computer readable storage medium having stored therein one or more programs for execution by one or more processors of a computing device. The one or more programs include instructions, when executed by the one or more processors, cause the processors to perform the operations as described above.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

To make the objectives, technical solutions and advantages of the present application more clearly, the following describes the present application in further detail with reference to the accompanying drawings and embodiments. It should be understood that the embodiments described here are only used to explain the present application, but are not used to limit the present application.

In this embodiment, in order to improve security of privacy protection, a method for displaying information content is provided and performed by a computing device (e.g., a computer or a mobile device). The implementation of the method may rely on a computer program, and the method may be run on a computer system based on the Von Neumann architecture.

Figure 1A:
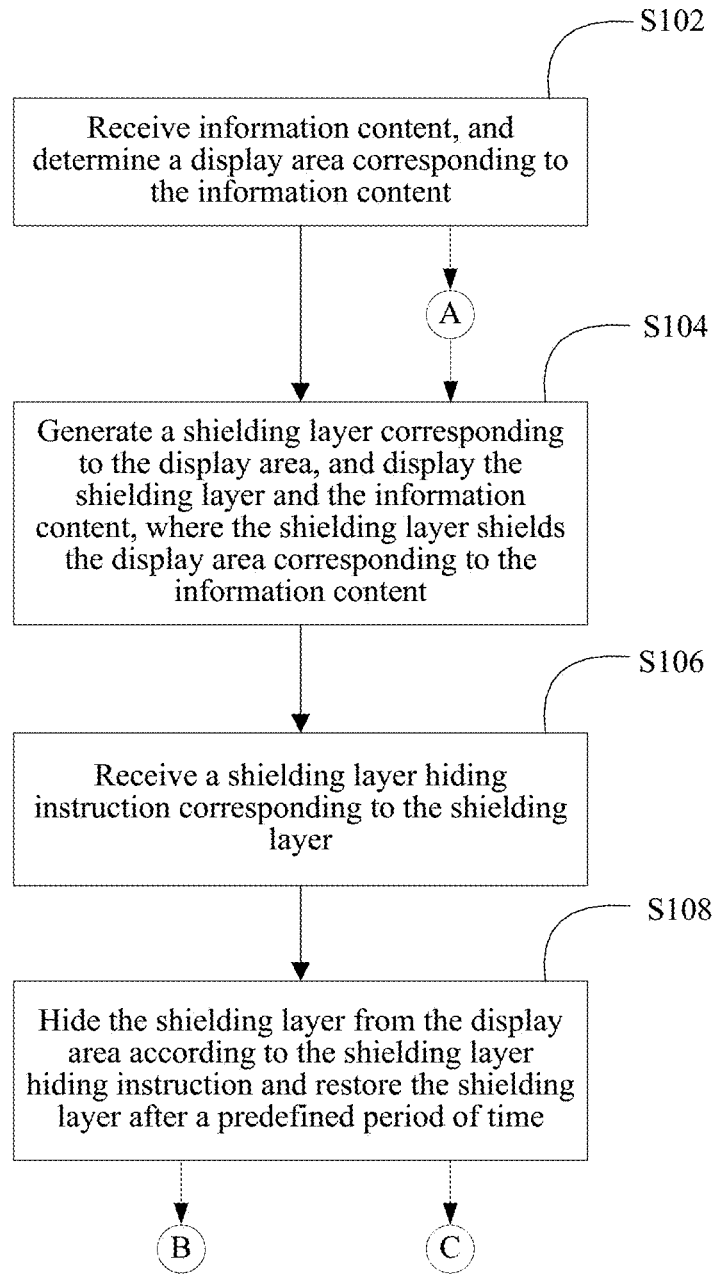
FIGS. 1A-1D are flowcharts of a method for displaying information content in accordance with some embodiments of the present application.

Specifically, as shown in FIG. 1A, the method includes:

Step S102: Receive information content, and determine a display area corresponding to the information content. In some embodiments, no content is to be displayed in the display area until after a shielding layer is generated.

Step S104: Generate a shielding layer corresponding to the display area, and display the shielding layer and the information content, where the shielding layer shields the display area corresponding to the information content.

Figure 1B:
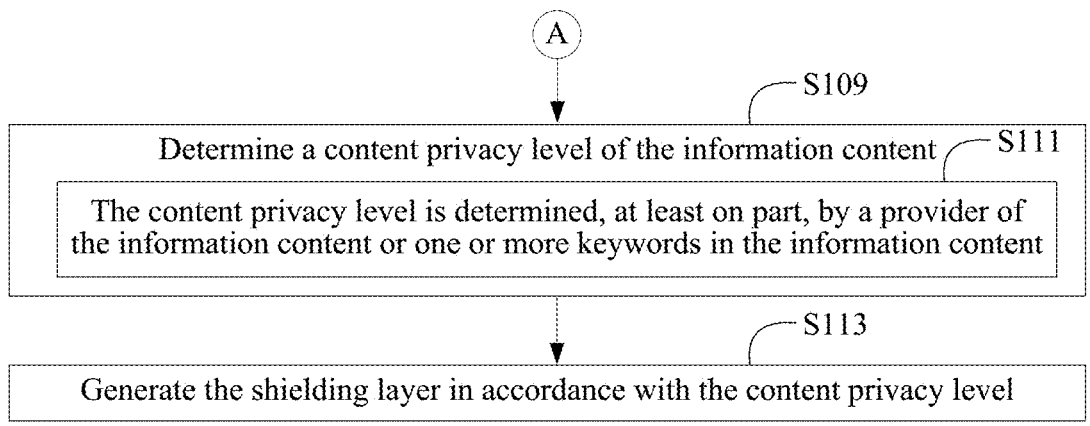

In some embodiments (as shown in FIG. 1B), before generating the shielding layer, the computing device determines (S109) a content privacy level of the information content and generates (S113) the shielding layer in accordance with the content privacy level. For example, the content privacy level is determined (S111), at least on part, by a provider of the information content or one or more keywords in the information content. For instance, the computing device receives a text message sent by a second user from another computing device. Before rendering such text message, the computing device may check the identity of the second user and determine whether there is a prior configuration such that all text messages from the second user should be shielded before they are rendered by the computing device. This configuration may be set by the user of the computing device or by the second user from the other computing device. In some other embodiments, the second user may selectively designate certain text messages to be covered by the shielding layer when they are displayed by the computing device. To do so, the second user may turn on such shielding option at the other computing device before sending a text message to the computing device. In yet some other embodiments, the computing device may search the incoming text messages for certain keywords, e.g., password, passcode, bank account, etc., to determine whether a shielding layer is necessary for security or privacy reason. Sometimes, certain contextual analysis may be employed for identifying those text messages that should be covered by the shielding layer. In sum, the shielding layer may be generated and applied to all the text messages from a particular user or a subset therefore based on the user's instruction or the content itself.

The information content may be media content such as text, pictures or videos, the display area of the information content is the display area corresponding to a GUI (Graphical User Interface) component or a web page tag that displays the media content. The shielding layer may be an interface element defined by the GUI component or the web page tag and located above the GUI component or the web page tag that displays the media content.

Figure 2:
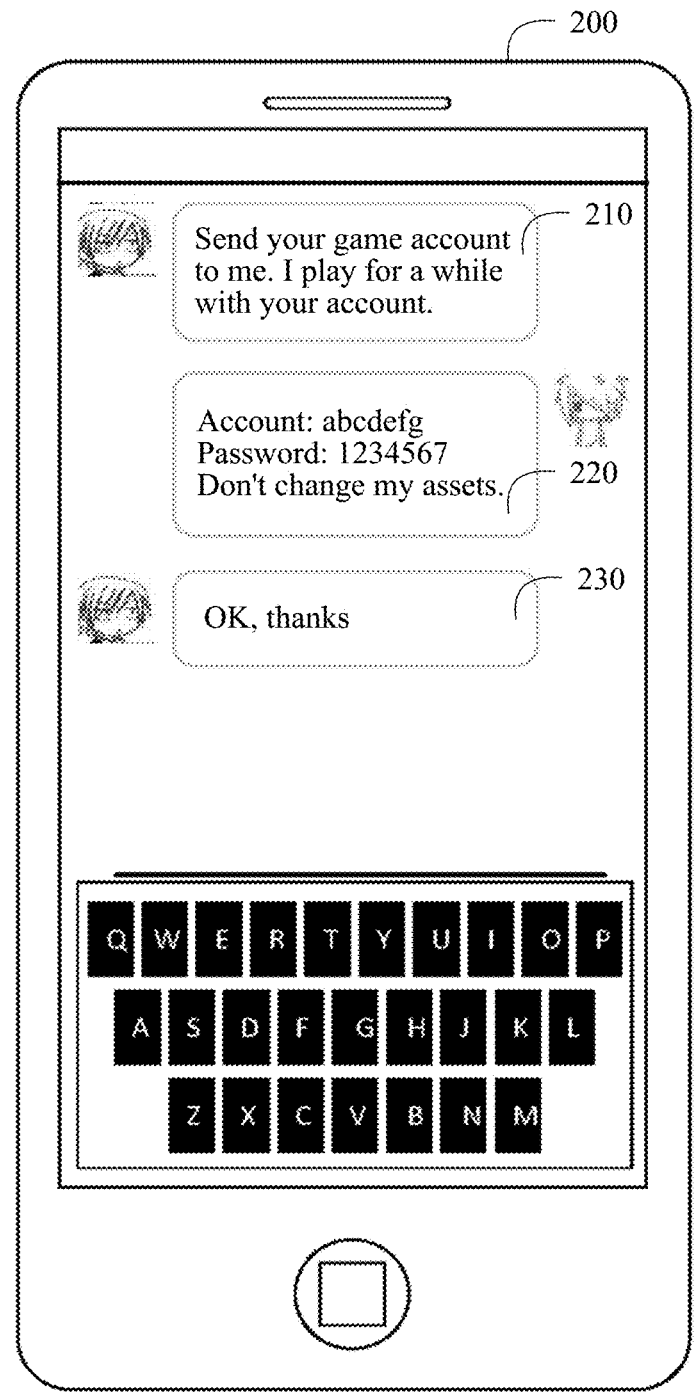
FIG. 2 is an exemplary interface block diagram of an information content display interface without any shielding layer in accordance with some embodiments of the present application.
Figure 3A:
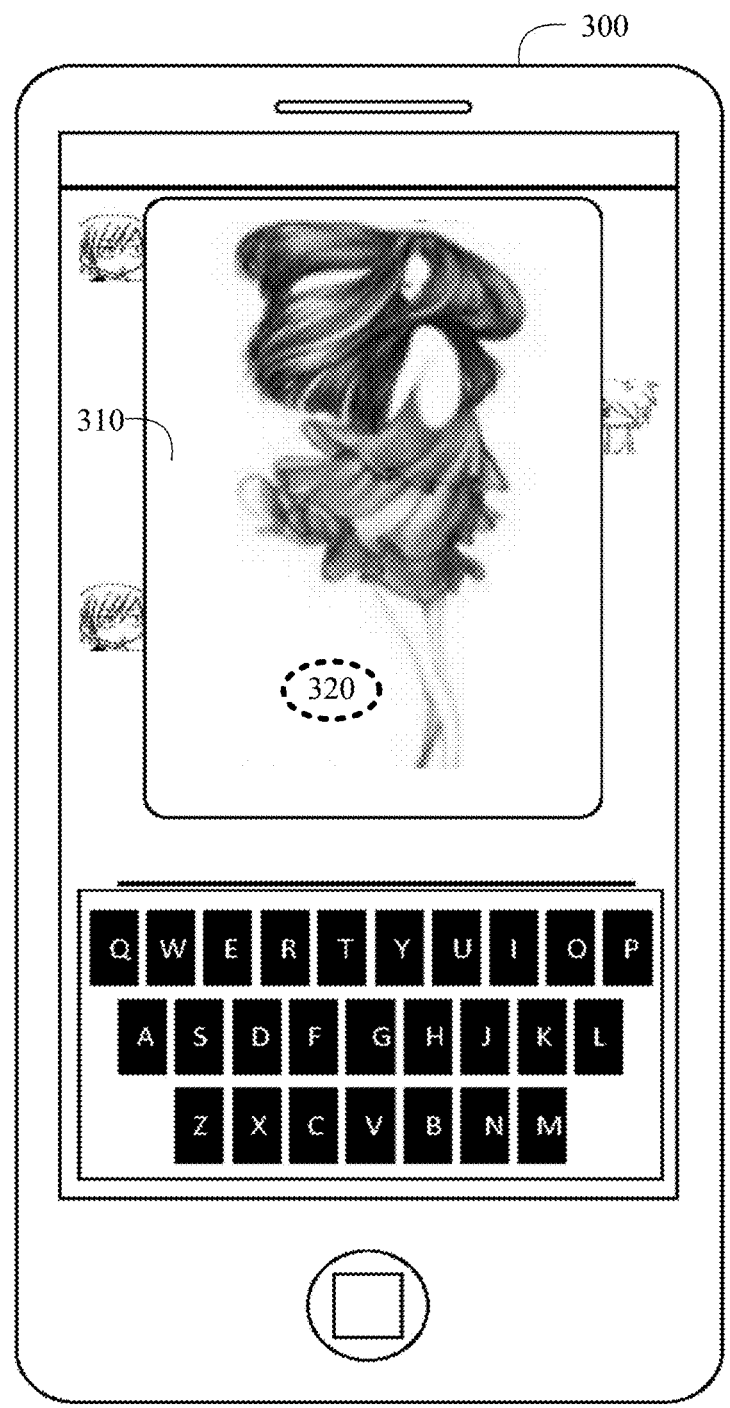
FIGS. 3A and 3B are exemplary interface block diagrams of an information content display interface with a shielding layer in accordance with some embodiments of the present application.
Figure 4A:
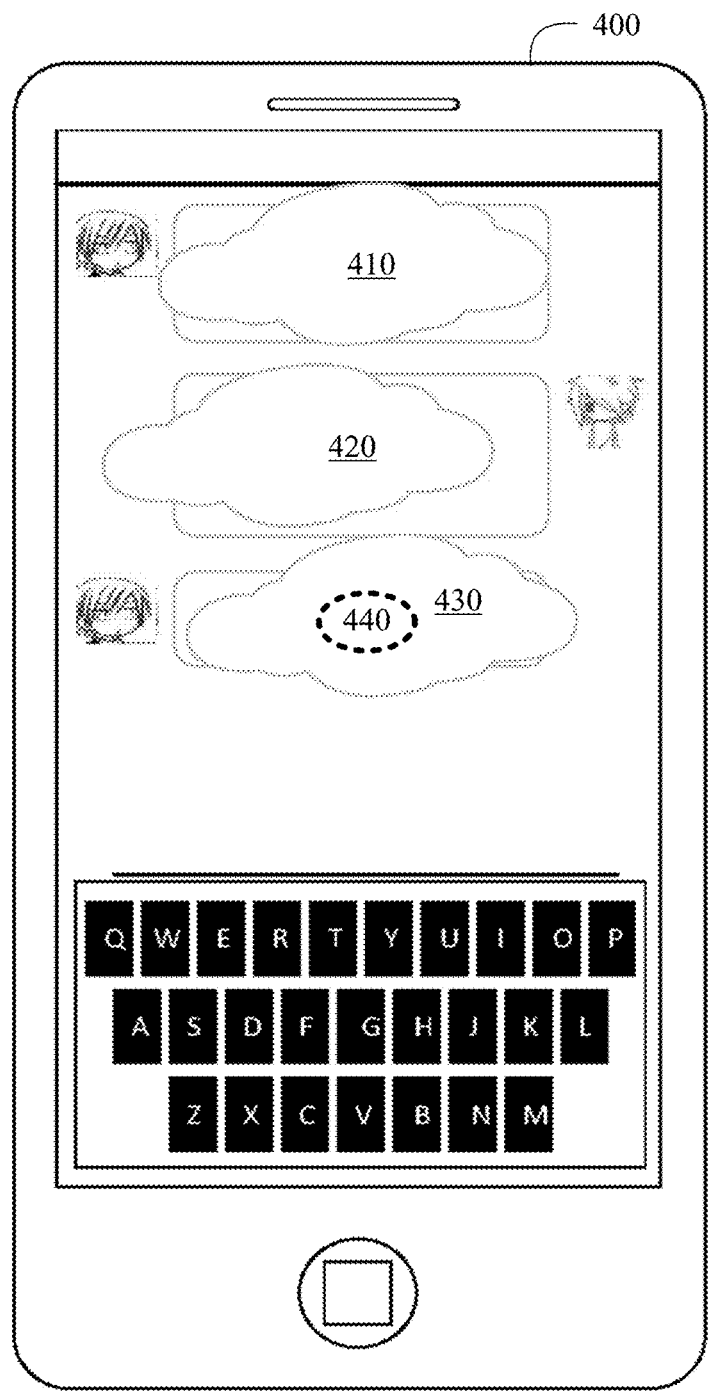
FIGS. 4A-4C are exemplary interface block diagrams of an information content display interface with a shielding layer in accordance with some embodiments of the present application.
Figure 5A:
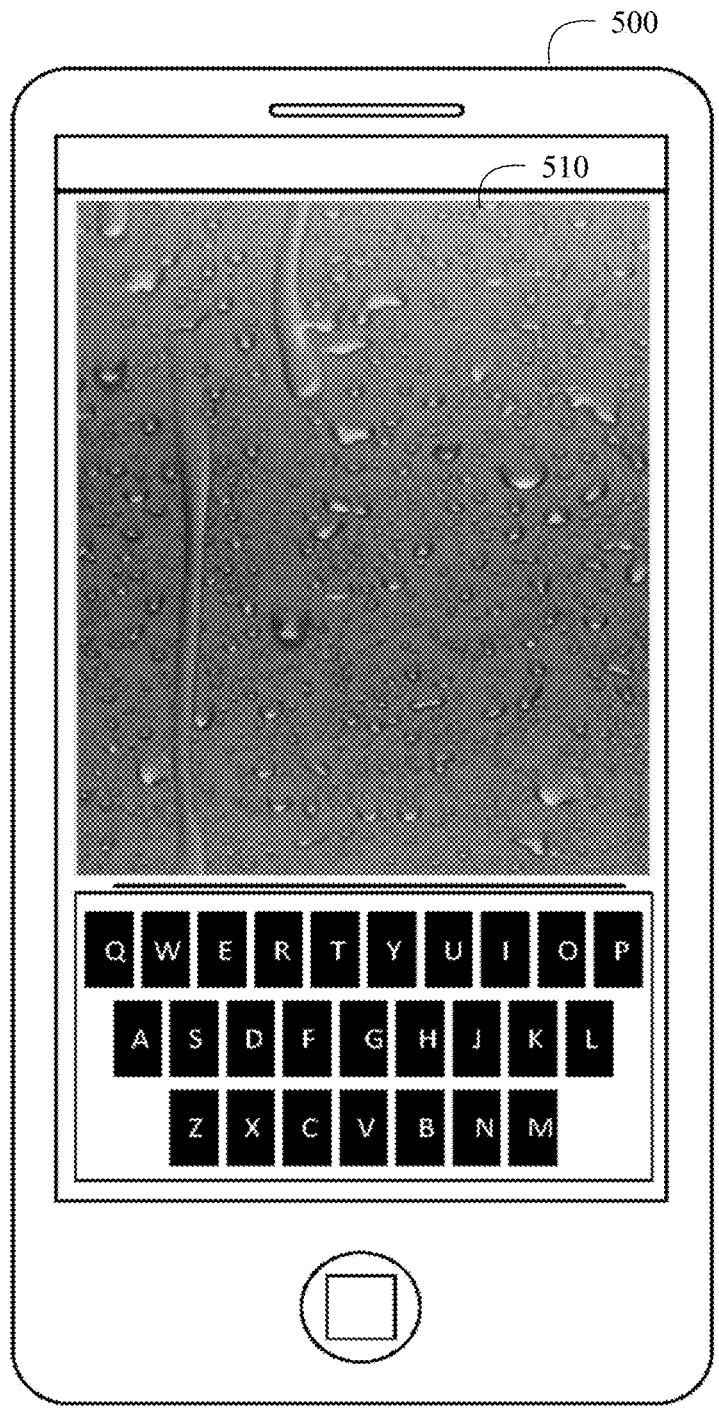
FIGS. 5A and 5B are an exemplary interface block diagrams of an information content display interface with a shielding layer in accordance with some embodiments of the present application.

For example, in an application scenario of a chat application, FIG. 2 is an exemplary interface block diagram illustrating the effect when the information content is displayed without the shielding layer. In this example, the interface 200 depicts three text messages 210, 220, 230 exchanged between two users regarding one user's account and password for playing certain online game. FIGS. 3A, 4A, and 5A are interface block diagrams illustrating the effect when the information content is displayed with a corresponding shielding layer added. The information content may be a chat record and messages sent between users, that is, chat content. The chat content may be text, pictures or videos (videos are displayed in a form of cover thumbnails), and may be displayed as a whole in a chat window, and each chat content is corresponding to a message display area (which may be defined in panel or div in a manner corresponding to an interface function of the GUI component invoked during displaying).

Shielding can also be implemented by adding a picture on the shielding layer as a background, and the added picture may be an opaque picture, an animated picture (for example, a gif picture) or a mosaic picture. As shown in FIG. 5A, a picture having a fog effect may be added on the shielding layer. In some embodiments, there is a dependency between a shielding layer and the underlying chat records such that the user can tell the nature of the information in the underlying chat records from the shielding layer itself. For example, a string of dollar signs "$$$" displayed in the shielding layer indicates that the underlying chat records may be related to financial data. Similarly, a text string of "XXX" displayed in the shielding layer indicates that the underlying chat records may be related to adult-only content.

In another application scenario of web browsing, when a browser or a client program having a browser function loads a web page and displays web page elements, the shielding layer may be added on a part of the web page elements. For example, for pictures or videos which are bloody, forbidden for people under 18 years old, or include adult content, the shielding layer may be added (for example, the shielding layer may be set by adding a div tag). When the web page to which the shielding layer is added is displayed, content that a user can view is healthy content which is not shielded by the shielding layer in the web page and a prompt picture on the shielding layer.

Step S106: Receive a shielding layer hiding instruction corresponding to the shielding layer.

Step S108: Hide the shielding layer from the display area according, to the shielding layer hiding instruction and restore the shielding layer after a predefined period of time in accordance with a shielding layer hiding mechanism. For example, some shielding layer hiding mechanism (e.g., FIGS. 3B and 4B) requires a user to enter a security passcode in order to view the information content hidden behind the shielding layer. Other shielding layer hiding mechanism (e.g., FIG. 5B) requires a user to continue sliding his finger on the displayer in order to view a portion of the information content hidden behind the shielding layer. In some embodiments, the shielding layer hiding mechanism is determined, at least in part, by the content privacy level of the information content. For example, the security passcode-based mechanism may be used for the information content with high content privacy level.

The user can hide the corresponding shielding layer by inputting the shielding layer hiding instruction to the shielding layer, so that the display area of the information content below the shielding layer is displayed. For example, the user may input the corresponding shielding layer hiding instruction by an operation of clicking the shielding layer or long pressing the shielding layer.

Hiding the shielding layer according to the shielding layer hiding instruction is to display the display area of the information content below the shielding layer. In this embodiment, the step of hiding the shielding layer according to the shielding layer hiding instruction may specifically be: hiding the shielding layer or setting the shielding layer to be transparent.

For example, in the application scenario of web browsing, if the user long presses the shielding layer, a touch operation event (corresponding to a smart phone) or a mouse operation event (corresponding to a desktop computer) of a div element corresponding to the shielding layer is triggered. The information content below the shielding layer may be completely displayed by removing the div label, or by setting a transparency property in the div label to be transparent.

Further, after the step of receiving the shielding layer hiding instruction corresponding to the shielding layer, a shielding end timestamp corresponding to the shielding layer hiding instruction may still be received; a timeout threshold is received, and a shielding restoring timestamp is set according to the timeout threshold and the shielding end timestamp; when the shielding restoring timestamp arrives, the shielding layer is hidden.

That is, if a preset timeout threshold is N seconds, after the shielding layer hiding instruction is triggered by the user long pressing the shielding layer, the shielding layer disappears for N seconds. Then, after N seconds, the shielding layer restores again and shields the display area of the corresponding information content. A method for hiding the shielding layer may include generating the shielding layer again as described or setting the transparency property of the shielding layer to be transparent.

In one embodiment, as shown in FIG. 3A, the shielding layer 310 corresponding to the entire chat window may be generated, which shields the chat window completely, that is, the shielding layer is added on top of the GUI component corresponding to the chat window. For example, there is a configuration that sets all the text messages exchanged between the two users in a chat be covered by a shielding layer. In other words, the shielding layer is applied to the chat regardless of its specific content. In this case, as described below, the shielding layer is hidden or removed from the display to expose all the text messages below when certain conditions are met.

Figure 1C:
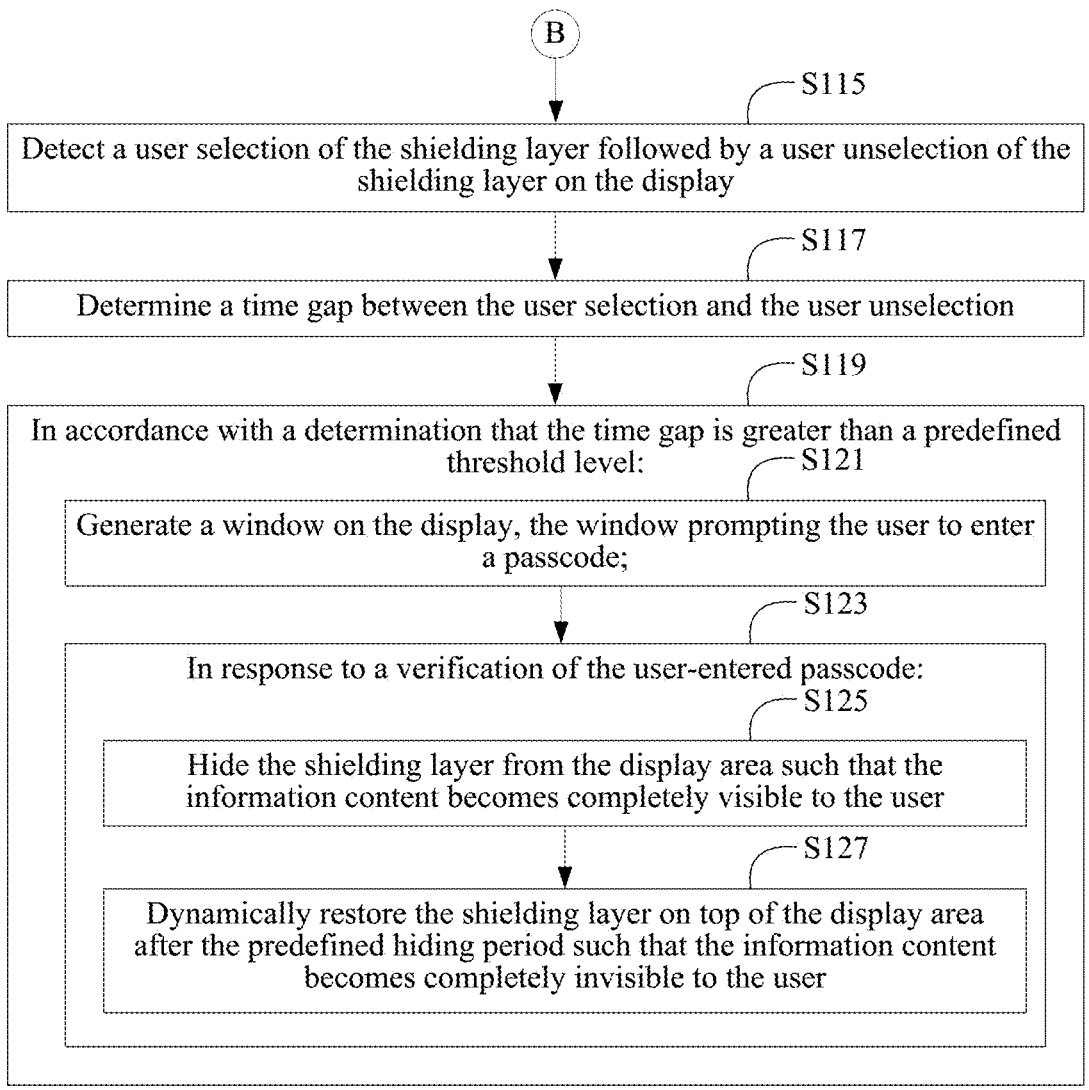
Figure 3B:
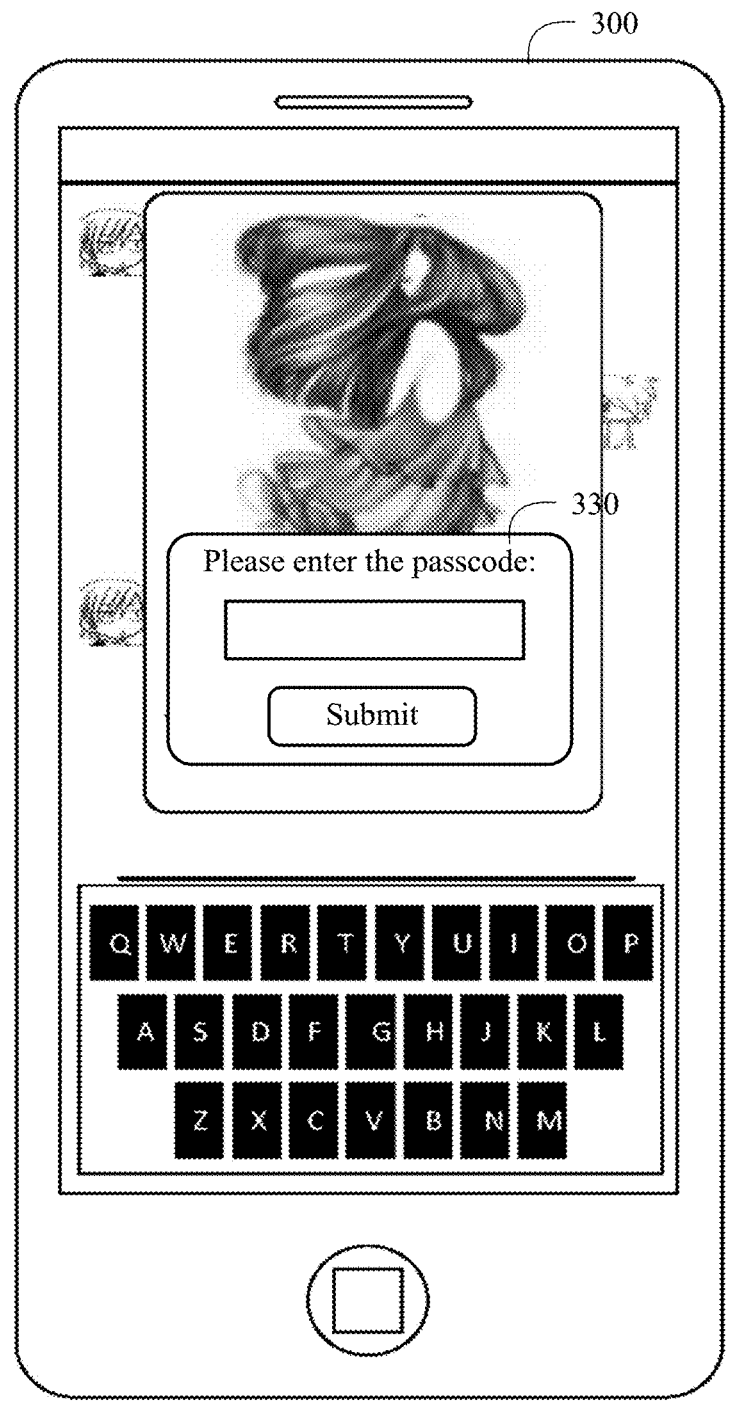

For example, as shown in FIG. 1C, the computing device detects (S115) a user selection of the shielding layer followed by a user unselection of the shielding layer on the display. FIG. 3A depicts a finger contact 320 on the shielding layer 310. This finger contact includes a finger press on the display (i.e., a user selection of the shielding layer 310) followed by a finger lift off the display (i.e., a user unselection of the shielding layer 310. Assuming that each act has an associated timestamp, the computing device determines (S117) a time gap between the user selection and the user unselection based on their associated timestamps. When the time gap is greater than a predefined threshold level (e.g., two seconds) (S119), the computing device generates (S121) a window on the display, the window prompting the user to enter a passcode. FIG. 3B depicts a popup window 330 that prompts the user to enter a predefined passcode required for viewing the content behind the shielding layer 310 and click the submit button. After verifying the user-entered passcode (S123), the computing device hides (S125) the shielding layer from the display area such that the information content becomes completely visible to the user. For example, all the three chat records shown in FIG. 2 become visible to the user. Then, after a predefined hiding period (e.g., three-five seconds), the computing device dynamically restores (S127) the shielding layer 310 on top of the display area such that the information content becomes completely invisible to the user. In some embodiments, the length of the hiding period depends at least in part on the volume of the information content hidden by the shielding layer 310. The more the information content the longer the hiding period.

Figure 4B:
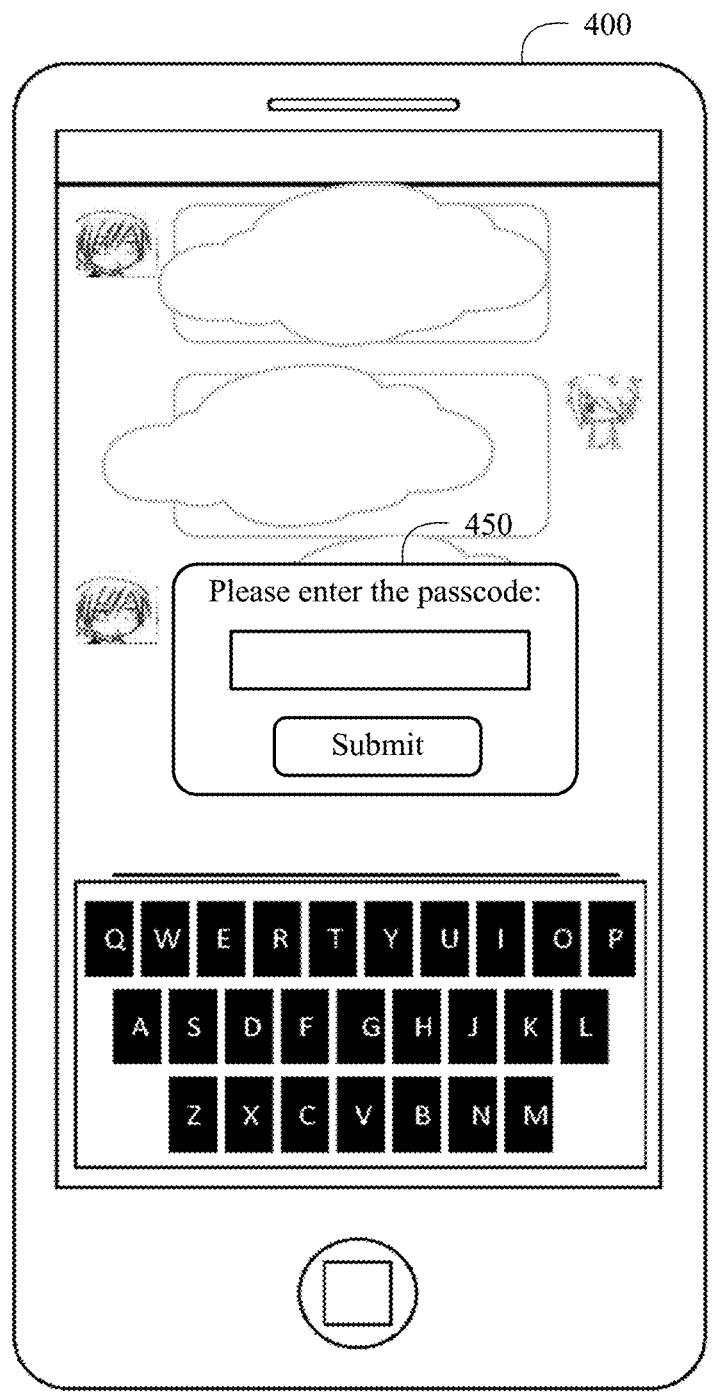
Figure 4C:
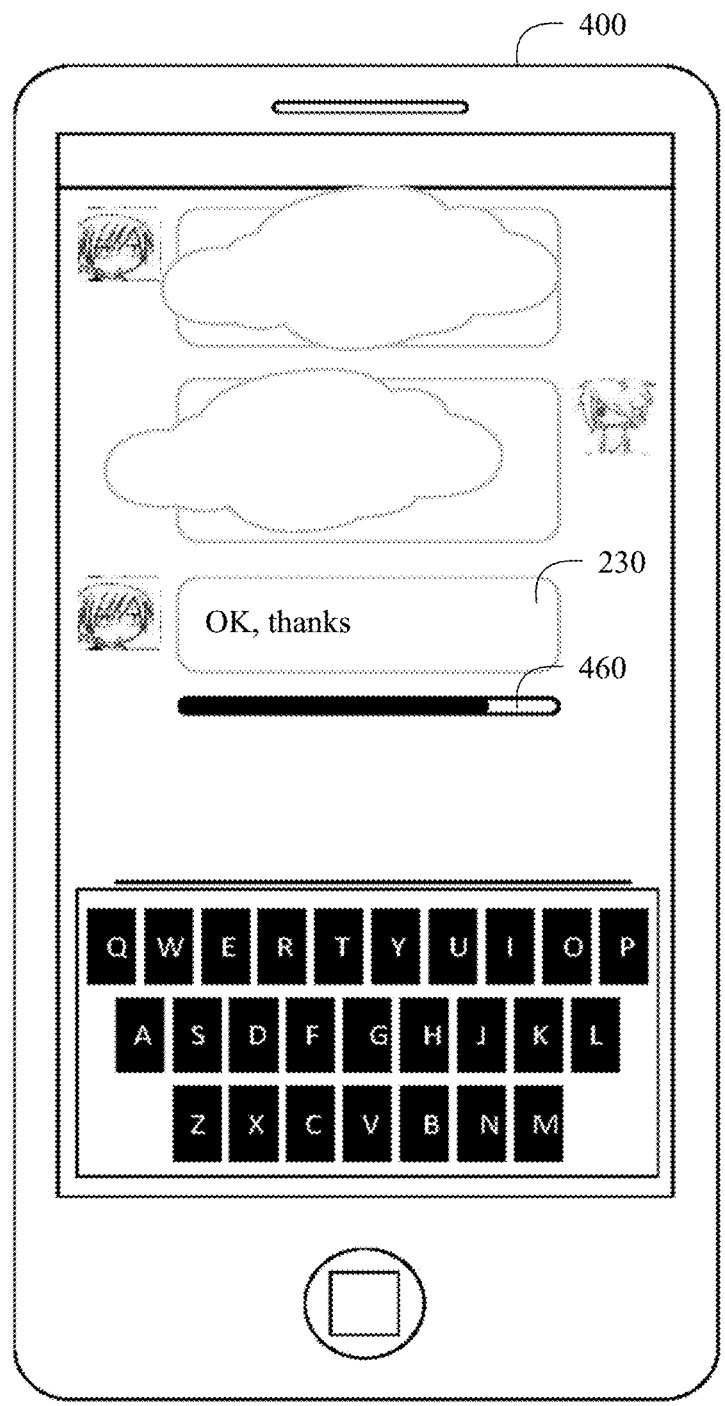

In another embodiment, as shown in FIG. 4A, one shielding layer may be added for the information display area corresponding to each chat record. In this case, the computing device generates three shield layers 410, 420, and 430, each shielding layer on top of a particular text message. Unlike the previous embodiments described in connection with FIGS. 3A and 3B, the three shielding layers can be removed separately without exposing the other messages. For example, in response to a user selection and unselection of the shielding layer 430 using the finger contact 440, the computing device generates a passcode-prompting popup window 450 as shown in FIG. 4B and then displays only the text messages behind the shielding layer 430 after verifying the user-entered passcode as shown in FIG. 4C. In some embodiments, a countdown progress bar 460 is displayed next to the exposed chat record 230 indicating how long the chat record can be exposed and how much time has already lapsed. In this example, the user can selectively remove one or more of the shielding layers to view the information content below. Although it requires more operations by the user, this approach is more secure and provides better privacy protection.

Preferably, as shown in FIG. 4C, a countdown progress bar 460 corresponding to the shielding layer may be set by the computing device. The countdown progress bar 460 is initially in a hidden state. After the shielding layer hiding instruction is triggered, the countdown progress bar 460 is displayed. A total time length of the countdown progress bar 460 is a time length of the timeout threshold, and decreases progressively until the time length. The user thus can intuitively know the restoration time of the shielding layer.

Preferably, a process of hiding the shielding layer may be set to a gradual process. For example, if the timeout threshold is 15 seconds, when there is 2 seconds left, transparency of the shielding layer is set to change from totally transparent to totally opaque gradually in 2 seconds. In some embodiments, the length of the hiding period depends at least in part on the volume of the information content hidden by the shielding layer such that the more the information content the longer the hiding period.

Further, before the step of hiding the shielding layer according to the shielding layer hiding instruction, user identity information may further be received, and the user identity information is verified. If the user identity information passes verification, the shielding layer is hidden.

For example, after the shielding layer hiding instruction is triggered by the user long pressing the shielding layer, the user is prompted to enter a security passcode. If the security passcode passes verification, the shielding layer is hidden. The security passcode may be a password preset by the user, for example, a security passcode managed by parents. The parents may preset the security passcode, for information content which has been shielded and includes pictures forbidden for people under 18 years old or adult content, the security passcode needs to be entered to hide the shielding layer. Since children do not have the security passcode, they cannot view corresponding information content.

The user identity information may further include service level information in an account of the user. For example, some web page pictures can be viewed only by a paying user. Therefore the pictures may be set to be shielded by the shielding layer, and the service level information in the user account with which the user logs in from the browser is received. If the user is a paying member, the user can hide the shielding layer from the display area for browsing after long pressing the shielding layer. The picture added on the shielding layer can also display advertisement information that prompts the user to pay.

Further, before the step of hiding the shielding layer according to the shielding layer hiding instruction, an object sliding/dragging event corresponding to the shielding layer hiding instruction is monitored, and a corresponding object sliding/dragging track is received; a wiping area corresponding to the object sliding/dragging track on the shielding layer is received.

The step of hiding the shielding layer according the shielding layer hiding instruction further includes hiding the wiping area.

The object sliding event corresponds to a system event triggered by sliding a finger or a stylus on a smart phone or a tablet computer that has a touch screen. The object dragging event corresponds to a system event triggered by dragging a mouse on a desktop computer having a mouse.

Figure 1D:
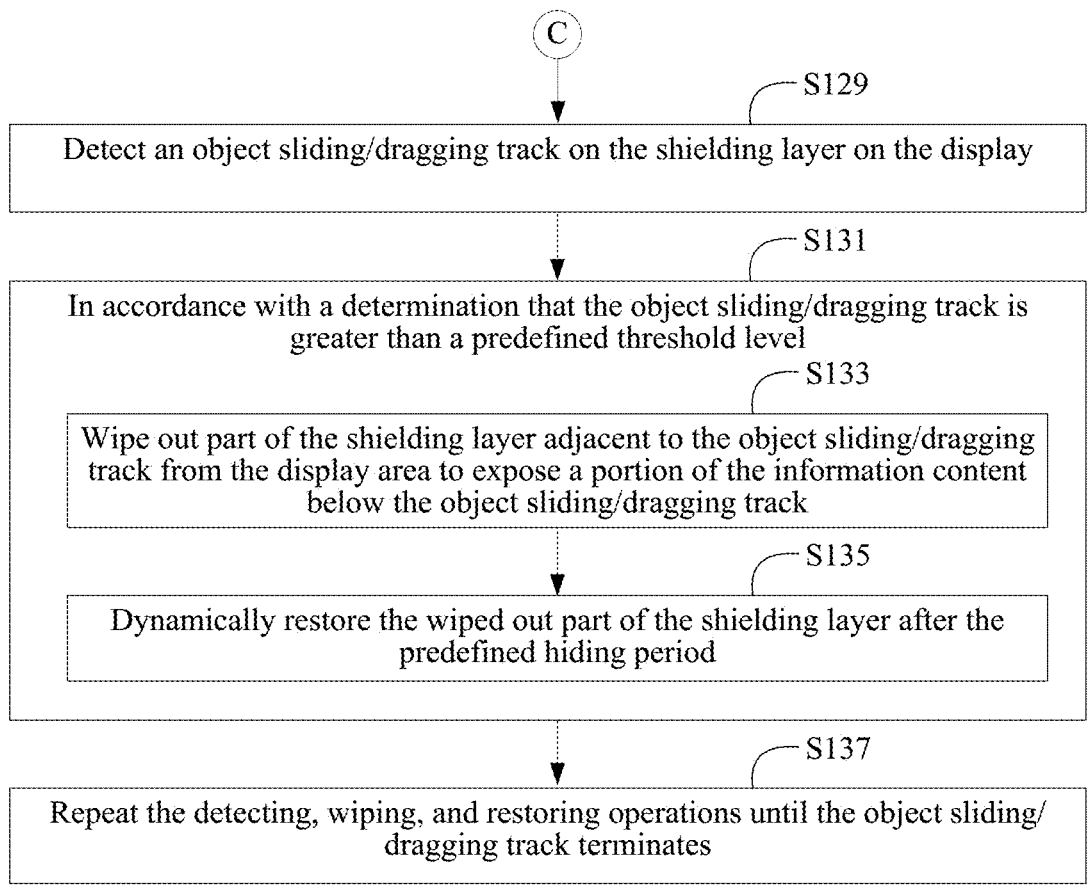

As shown in FIG. 1D, the computing device detects (S129) an object sliding/dragging track on the shielding layer on the display. When the object sliding/dragging track is greater than a predefined threshold level (S131), e.g., the length of the track is greater than a predefined distance, the computing device determines a corresponding shielding layer hiding mechanism for this shielding layer and acts accordingly. For example, the computing device wipes out (S133) part of the shielding layer adjacent to the object sliding/dragging track from the display area to expose a portion of the information content below the object sliding/dragging track. In other words, this shielding layer hiding mechanism does not require the user to enter a security passcode before hiding any shielding layer. Rather, only a portion of the shielding layer is removed to expose the information content below.

Figure 5B:
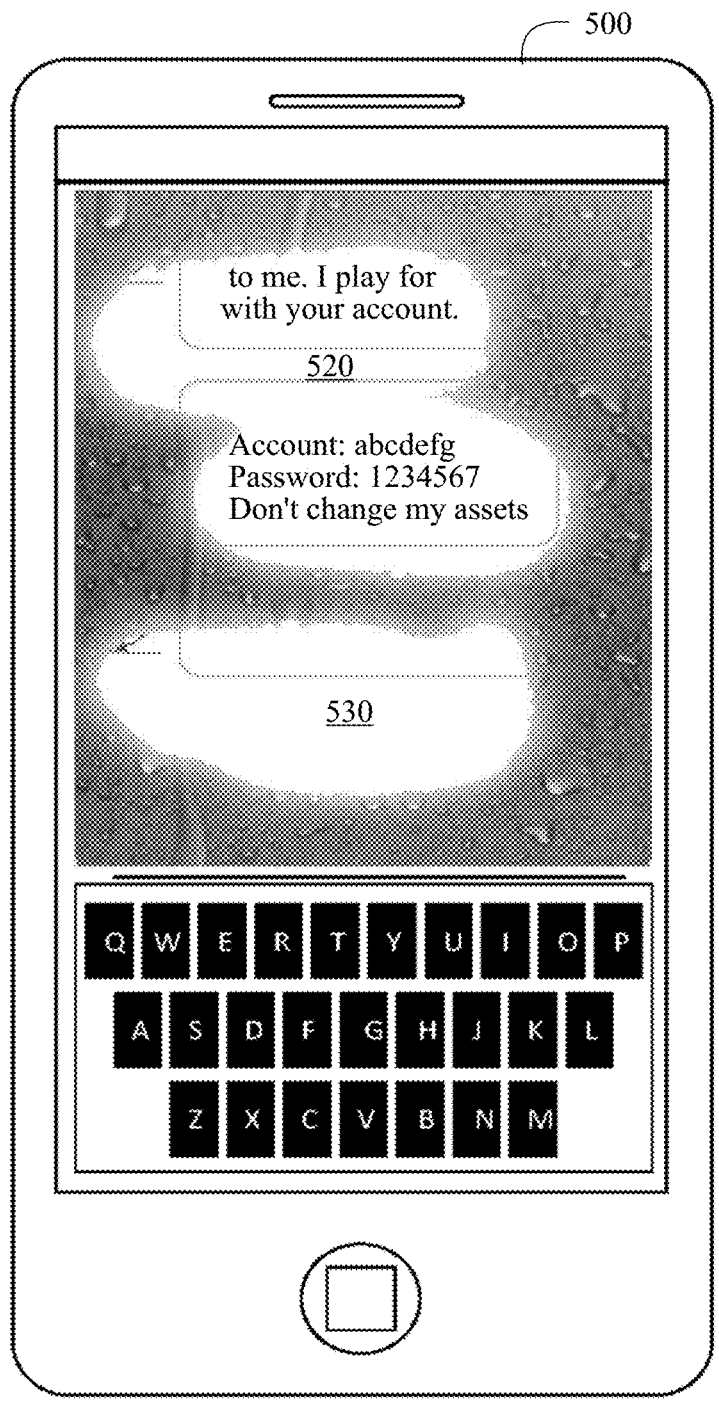

As shown is FIG. 5A, a picture 510 having a fog effect is used as the shielding layer to shield the chat content in the user interface 500. As shown in FIG. 5B, when the user slides his finger on the shielding layer having the fog effect, following the tracks 520 and 530 of the sliding operation, an area corresponding to the track on the shielding layer is set to a transparent state. In this example, the track 520 exposes a portion of the first message and the second message. But the track 530 misses the third message in the user interface 500. Thus, a visual effect that a finger wipes out the fog to display the chat content below is created. The user performs a wiping operation on the shielding layer selectively as required, so as to gradually display the chat content and protect the privacy part from being displayed completely, which further improves security of privacy protection.

In some embodiments, the effect caused by the wiping operation is temporary and the exposed portion becomes invisible again after a predefined hiding period. For example, the computing device dynamically restores (S135) the wiped out part of the shielding layer after the predefined hiding period. But the computing device may repeat (S137) the detecting, wiping, and restoring operations until the object sliding/dragging track terminates.

In sum, the information content may be shielded by different types of shielding layers. The computing device may adaptively implement a shielding layer hiding mechanism based on the user interaction with the display of the computing device. For example, a long press on the display may trigger the passcode-based mechanism as described above in connections with FIGS. 3B and 4B. But a finger swipe on the display may trigger the wiping-based mechanism as described above in connections with FIG. 5B. The computing device can easily switch between different mechanisms in accordance with the user instructions. For example, the user may begin with the wiping-based mechanism. But after applying several swiping gestures on the display, the user may decide to view the entire information content shielded by the shielding layers. To do so, the user can simply press his finger on the display and hold it for at least a predefined time period and then lift the finger off the display.

In an embodiment, before the step of generating shielding layer corresponding to the display area, the method further includes: receiving a type tag of the information content, determining whether the information content needs shielding according to the type tag, and if yes, performing the step of generating a shielding layer corresponding to the display area.

For example, in the aforementioned application scenario corresponding to a chat application, when sending chat content, the user that sends information may attach a type tag for the chat content. The type tag may include two types, that is, needing shielding or not needing shielding (no type tag is classified as the type of not needing shielding). When a terminal that receives the chat content is loading the chat content, the type tag of the chat content may be received firstly. If the type tag is needing shielding, then add the shielding layer for the chat content; otherwise, display the chat content normally without adding the shielding layer. Because the chat application is usually forwarded by a server, all history chat content may be stored in the server, and the user that sends information may also change the type tag of the chat content after the chat content is sent. To view the chat content, the user that receives the chat content needs to download the chat content from the server, and at this time whether the shielding layer needs to be added may be determined again according to the type tag of the chat content.

In the aforementioned application scenario of web browsing, the browser can receive the type tag of a picture in a web page, for example, text description or an additional identifier of the picture. If it is determined that shielding is needed, the shielding layer is added for the picture.

Figure 6:
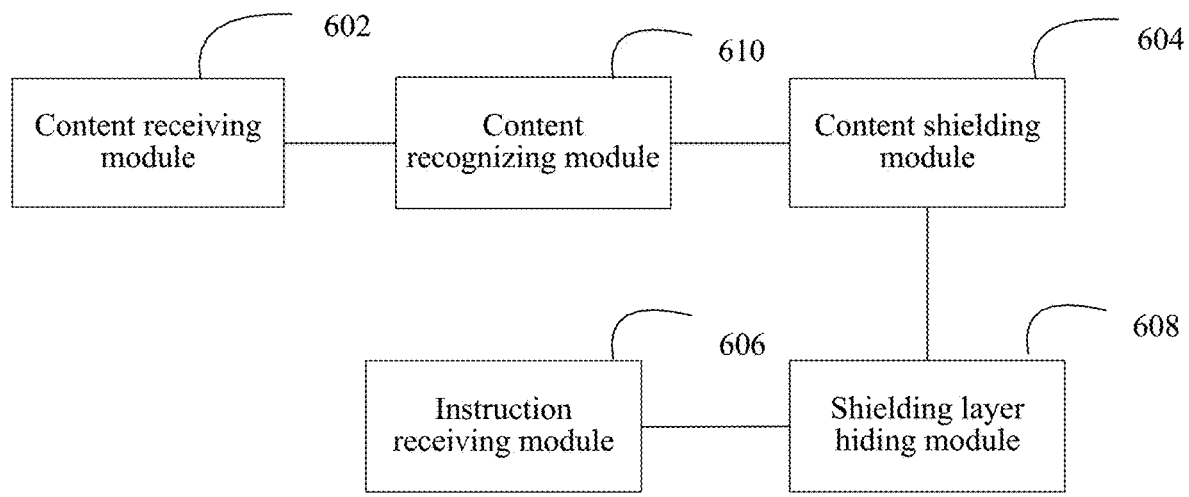
FIG. 6 is a schematic structural diagram of a computing device for displaying information content in accordance with some embodiments of the present application.

In an embodiment, as shown in FIG. 6, a computing device for displaying information content includes: a content receiving module 602, a content shielding module 604, an instruction receiving module 606 and a shielding layer hiding module 608, where:

The content receiving module 602 is configured to receive the information content and determine a display area corresponding to the information content.

The content shielding module 604 is configured to generate a shielding layer corresponding to the display area, and display the shielding layer and the information content, where the shielding layer shields the display area corresponding to the information content.

The instruction receiving module 606 is configured to receive a shielding layer hiding instruction corresponding to the shielding layer.

The shielding layer hiding module 608 is configured to hide the shielding layer from the display area according to the shielding layer hiding instruction.

In an embodiment, the shielding layer hiding module 608 is further configured to hide the shielding layer or set the shielding layer to be transparent.

In an embodiment, the content shielding module 604 is further configured to receive a shielding end timestamp corresponding to the shielding layer hiding instruction, receive a timeout threshold and set a shielding restoring timestamp according to the timeout threshold and the shielding end timestamp, and hide the shielding layer from the display area when the shielding restoring timestamp arrives.

In an embodiment, the instruction receiving module 606 is further configured to monitor an object sliding/dragging event corresponding to the shielding layer hiding instruction, receive a corresponding object sliding/dragging track, and receive a wiping area corresponding to the object sliding/dragging track on the shielding layer.

In an embodiment, the shielding layer hiding module 608 is further configured to hide the wiping area.

In an embodiment, as shown in FIG. 6, the computing device for displaying information content further includes a content recognizing module 610, which is configured to receive a type tag of the information content, determine whether the information content needs shielding according to the type tag, and if yes, invoke the content shielding module.

When the computing device for displaying information content displays information content which can be perceived visually, such as text, pictures or videos, the information content may be shielded by the shielding layer firstly, and then the shielding layer is hidden to display the information content by a user manually inputting the shielding layer hiding instruction when the user is sure that the user is in a secure environment. Thus, privacy of the user would not be displayed on a display screen without the user's awareness, and people around the user cannot see the information content by peeping at the display screen, thereby improving security of privacy protection.

Figure 7:
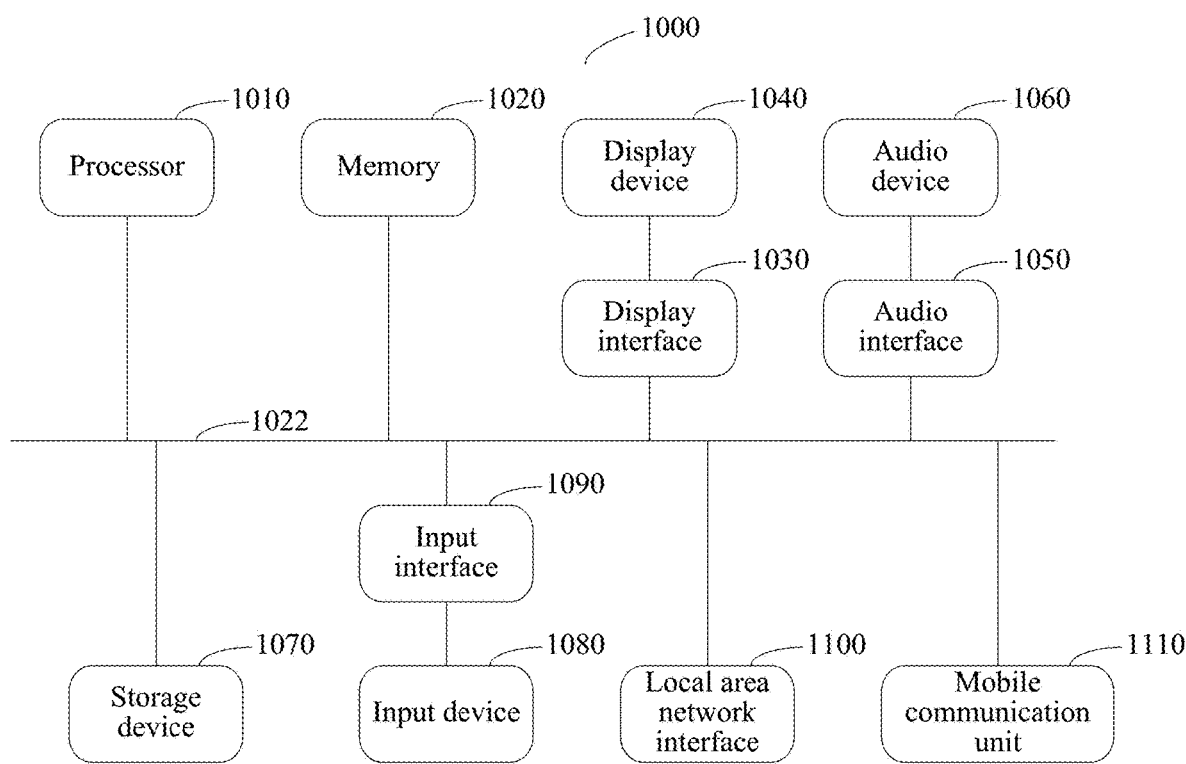
FIG. 7 is a diagram illustrating hardware components of a computing device performing the method for displaying information content in accordance with some embodiments of the present application.

FIG. 7 is a module diagram illustrating hardware components of a computing system performing the method for displaying information content in accordance with some embodiments of the present application. The computer system 1000 is just an example of a computer environment to which the present application is applicable to, and cannot be deemed as any limit to the use scope of the present application. The computer system 1000 cannot be construed as being dependent on or having any part or a combination of multiple parts of the exemplary computer system 1000 shown in FIG. 7.

The computer system 1000 shown in FIG. 7 is an example of a computer system to which the present application is applicable. Other architectures having different sub-system configurations may also be used. For example, some embodiments of the present application may be applicable to a known desktop computer, notebook computer, personal digital assistant, smart phone, tablet computer, portable media player, set-top box and the like. However, the present application is not limited to the devices listed above.

As shown in FIG. 7, the computer system 1000 includes a processor 1010, a memory 1020 and a system bus 1022. Various system components such as the memory 1020 and the processor 1010 are connected to the system bus 1022. The processor 1010 is hardware for executing a computer program instruction by using basic arithmetic and logical operations in the computer system. The memory 1020 is a physical device for temporarily or permanently storing computer programs or data (for example, program state information). The system bus 1022 may be of any of the following bus structure types, including a memory bus or storage control device, a peripheral bus and a local bus. The processor 1010 and the memory 1020 can perform data communication through the system bus 1022. The memory 1020 is a non-transitory computer readable storage medium including a read-only memory (ROM) or a flash memory (both not shown in the figure), and a random access memory (RAM). The RAM often refers to a main memory in which an operating system and an application are loaded.

The computer system 1000 further includes a display interface 1030 (for example, a graphics processing unit), a display device 1040 (for example, a liquid crystal display), an audio interface 1050 (for example, a sound card) and an audio device 1060 (for example, a loudspeaker). The display device 1040 and the audio device 1060 are media devices used for experiencing multimedia content.

The computer system 1000 generally includes a storage device 1070. The storage device 1070 may be selected from multiple types of computer readable media. The computer readable medium refers to any available medium that can be accessed by the computer system 1000, including removable and fixed media. For example, the computer readable medium includes, but is not limited to, a flash memory (a micro SD card), a CD-ROM, a digital versatile disc (DVD) or another disk storage, a tape cassette, tape, a disk storage or another magnetic storage device, or any other medium that can be used to store required information and can be accessed by the computer system 1000.

The computer system 1000 further includes an input device 1080 and an input interface 1090 (for example, an IO controller). A user may input an instruction and information into the computer system 1000 by using the input device 1080, such as a keyboard, a mouse or a touch panel device on the display device 1040. The input device 1080 is connected to the system bus 1022 through the input interface 1090 generally, but also may be connected to the system bus 1022 through another bus structure or interface, for example, a universal serial bus (USB).

The computer system 1000 may be logically connected to one or more network devices in the network environment. The network device may be a personal computer, a server, a router, a smart phone, a tablet computer or another public network node. The computer system 1000 is connected to the network device through a local area network (LAN) interface 1100 or a mobile communication unit 1110. A local area network (LAN) refers to a computer network interconnecting devices in a limited area, such as a home, a school, a computer laboratory, or an office building using network media. Wi-Fi and the Ethernet with twisted pair cabling are two most commonly used technologies for creating a local area network. WiFi is a technology that enables the computer system 1000 to exchange data or to be connected to a wireless network through radio wave. The mobile communication unit 1110 can answer and make a call through a radio communication line in a wide geographic area while moving. Except for phone calls, the mobile communication unit 1110 also supports Internet access in a 2G, 3G, or 4G cellular communications system that provides a mobile data service.

It should be noted that another computer system that includes more or fewer sub-systems than the computer system 1000 can also be applied in the present application. For example, the computer system 1000 may include a Bluetooth unit that can exchange data in a short distance, an image sensor for taking a picture, and an accelerometer for measuring acceleration.

As described above in detail, the computer system 1000 to which the present application is applicable can execute specified operations of the method for displaying information content. The computer system 1000 executes these operations in a manner that the processor 1010 runs software instructions in the computer readable medium. The software instructions may be read into the memory 1020 from the storage device 1070 or from another device through the local network interface 1100. The software instructions stored in the memory 1020 enable the processor 1010 to execute the method for displaying information content. Besides, the present application can also be implemented by using a hardware circuit or a combination of a hardware circuit and the software instructions. Therefore, the implementation of the present application is not limited to any specified combination of the hardware circuit and software.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of displaying information content, comprising:
    at a computing device having one or more processors and memory for storing programs to be executed by the one or more processors and a touch screen display:
    receiving information content, wherein the information content is rendered in a predefined display area of the display;
    generating a shielding layer for the information content;
    displaying the shielding layer on top of the display area, wherein the shielding layer has a foggy visual effect such that the information content under the shielding layer becomes invisible;
    receiving a shielding layer hiding instruction from a user of the computing device;
    in accordance with a determination that the shielding layer hiding instruction comprises a clicking action by the user on the touch screen display;
    displaying a popup window for prompting the user to enter a security passcode;
    receiving a passcode entered by the user;
    after verifying the passcode, removing the shielding layer from the display area such that the information content under the shielding layer becomes completely visible to the user;
    displaying next to the information content a countdown progress bar indicating a length of time that the information content will remain visible; and
    restoring the shielding layer after the length of time has elapsed; and
    in accordance with a determination that the shielding layer hiding instruction comprises an object sliding/dragging track based on a single finger wipe action on the shielding layer on the touch screen display;
    determining that the object sliding/dragging track based on the single finger wipe action on the touch screen display is greater than a predefined distance;
    in accordance with the determining, removing the foggy visual effect at a corresponding part of the shielding layer adjacent to the object sliding/dragging track from the display area to expose a portion of the underlying information content in its original format below the object sliding/dragging track while keeping the foggy visual effect outside the corresponding part of the shielding layer;
    dynamically restoring the foggy visual effect at the corresponding part of the shielding layer after a predefined hiding period in accordance with a shielding hiding mechanism, so that the exposed portion of the underlying information content becomes invisible again; and
    repeating the detecting, removing, and restoring operations until the object sliding/dragging track terminates.

2. The method of claim 1, further comprising: before generating the shielding layer: determining a content privacy level of the information content; and generating the shielding layer in accordance with the content privacy level.

3. The method of claim 2, wherein the content privacy level is determined, at least on part, by a provider of the information content or one or more keywords in the information content.

4. The method of claim 2, wherein the shielding layer hiding mechanism is determined, at least in part, by the content privacy level of the information content.

5. A computing device, comprising:
one or more processors;
memory;
a touch screen display; and
one or more program modules stored in the memory, wherein the one or more program modules include instructions to be executed by the one or more processors, the instructions further including:
receiving information content, wherein the information content is rendered in a predefined display area of the touch screen display; generating a shielding layer for the information content;
displaying the shielding layer on top of the display area, wherein the shielding layer has a foggy visual effect such that the information content under the shielding layer becomes invisible;
receiving a shielding layer hiding instruction from a user of the computing device;
in accordance with a determination that the shielding layer hiding instruction comprises a clicking action by the user on the touch screen display;
displaying a popup window for prompting the user to enter a security passcode;
receiving a passcode entered by the user;
after verifying the passcode, removing the shielding layer from the display area such that the information content under the shielding layer becomes completely visible to the user;
displaying next to the information content a countdown progress bar indicating a length of time that the information content will remain visible; and
restoring the shielding layer after the length of time has elapsed; and
in accordance with a determination that the shielding layer hiding instruction comprises an object sliding/dragging track based on a single finger wipe action on the shielding layer on the touch screen display;
determining that the object sliding/dragging track based on the single finger wipe action on the touch screen display is greater than a predefined distance;
in accordance with the determining, removing the foggy visual effect at a corresponding part of the shielding layer adjacent to the object sliding/dragging track from the display area to expose a portion of the underlying information content in its original format below the object sliding/dragging track while keeping the foggy visual effect outside the corresponding part of the shielding layer;
dynamically restoring the foggy visual effect at the corresponding part of the shielding layer after a predefined hiding period in accordance with a shielding hiding mechanism, so that the exposed portion of the underlying information content becomes invisible again; and
repeating the detecting, removing, and restoring operations until the object sliding/dragging track terminates.

6. The computing device of claim 5, wherein the instructions further include: before generating the shielding layer: determining a content privacy level of the information content; and generating the shielding layer in accordance with the content privacy level.

7. The computing device of claim 6, wherein the content privacy level is determined, at least on part, by a provider of the information content or one or more keywords in the information content.

8. The computing device of claim 6, wherein the shielding layer hiding mechanism is determined, at least in part, by the content privacy level of the information content.

9. A non-transitory computer readable storage medium storing one or more program modules, the one or more program modules comprising instructions, which, when executed by one or more processors of a computing device having a touch screen display, cause the computing device to perform operations including:
receiving information content, wherein the information content is rendered in a predefined display area of the display;
generating a shielding layer for the information content;
displaying the shielding layer on top of the display area, wherein the shielding layer has a foggy visual effect such that the information content under the shielding layer becomes invisible;
receiving a shielding layer hiding instruction from a user of the computing device;
in accordance with a determination that the shielding layer hiding instruction comprises a clicking action by the user on the touch screen display;
displaying a popup window for prompting the user to enter a security passcode;
receiving a passcode entered by the user;
after verifying the passcode, removing the shielding layer from the display area such that the information content under the shielding layer becomes completely visible to the user;
displaying next to the information content a countdown progress bar indicating a length of time that the information content will remain visible; and
restoring the shielding layer after the length of time has elapsed; and
in accordance with a determination that the shielding layer hiding instruction comprises an object sliding/dragging track based on a single finger wipe action on the shielding layer on the touch screen display;
determining that the object sliding/dragging track based on the single finger wipe action on the touch screen display is greater than a predefined distance;
in accordance with the determining, removing the foggy visual effect at a corresponding part of the shielding layer adjacent to the object sliding/dragging track from the display area to expose a portion of the underlying information content in its original format below the object sliding/dragging track while keeping the foggy visual effect outside the corresponding part of the shielding layer;
dynamically restoring the foggy visual effect at the corresponding part of the shielding layer after a predefined hiding period in accordance with a shielding hiding mechanism, so that the exposed portion of the underlying information content becomes invisible again.

10. The non-transitory computer readable storage medium of claim 9, wherein the operations further include: before generating the shielding layer: determining a content privacy level of the information content; and generating the shielding layer in accordance with the content privacy level.

11. The non-transitory computer readable storage medium of claim 10, wherein the content privacy level is determined, at least on part, by a provider of the information content or one or more keywords in the information content.

12. The non-transitory computer readable storage medium of claim 10, wherein the shielding layer hiding mechanism is determined, at least in part, by the content privacy level of the information content.

* * * * *